Patented Jan. 21, 1941

2,229,573

UNITED STATES PATENT OFFICE 2,229,573

PROCESS FOR THE PRODUCTION OF TRIMETHYLHYDROQUINONES

Fritz Jung, Darmstadt, Germany, assignor to Merck & Co., Inc., Rahway, N. J., a corporation of New Jersey No Drawing. Application April 5, 1939, Serial No. 266,133. In Germany May 4, 1938

6 Claims. (Cl. 260—621)

This invention relates to processes for the production of trimethylhydroquinones.

In my application S. N. 221,445, filed July 26, 1938, there is described a simple process for the production of durohydroquinone, that is, tetramethylhydroquinone, by catalytic reduction of the corresponding quinone (duroquinone).

I have now found that trimethylhydroquinone (pseudocumbohydroquinone) may be prepared similarly by catalytic reduction of trimethylquinone.

Heretofore, only very complicated processes have been available for the reduction of trimethylquinone as, for example, by heating with zinc dust in acetic acid, or by treatment with sulfurous acid.

Such prior processes are not suitable for the production of trimethylhydroquinone on a large scale, however, because, the working up of the reaction mixture, particularly the separation of the desired end product from the excess and from the conversion products of the reducing agent, is complicated.

Also, since solutions of trimethylhydroquinone are susceptible to attack by atmospheric oxygen, a simpler process for the production of trimethylhydroquinone is desirable.

I have now found that trimethylhydroquinone may be prepared by catalytic hydrogenation of trimethylquinone, which permits easy separation of the desired end product in pure form. It was not to be expected that trimethylhydroquinone could be thus obtained by a smooth reaction in approximately theoretical yield, because, in general, hydroquinones are easily reduced even by catalytic hydrogen, and, therefore, nuclear hydrogenation could have been expected.

The process of my invention comprises hydrogenation of trimethylquinone in an organic solvent with hydrogen gas in the presence of a hydrogenation catalyst. As catalysts, may be used the known hydrogenation catalysts, that is the precious metal catalysts, as well as catalysts of the non-precious metal series, as for instance, nickel.

The solvents which may be employed according to my invention include, for example, distilled alcohol, distilled toluene, ether, glacial acetic acid, and dilute acetic acid. Increased temperatures and pressures may be employed but are not required; preferably, ordinary temperature and pressure conditions are employed.

In general, in carrying out the process according to my invention, absorption of hydrogen ceases when the theoretical quantity has been taken up. The quantity of catalyst required may be kept comparatively small.

The process of my invention is illustrated in the following example in which, as will be apparent, various modifications may be made without departing from the spirit and scope thereof.

Example

About 100 gms. of pseudocumoquinone is dissolved in 3 liters of alcohol, about 5 gms. of 10% pallidium charcoal is added, and the whole shaken with hydrogen at room temperature. Hydrogenation is complete after about one hour. The catalyst is filtered off by suction in vacuum and the filtrate evaporated to dryness under vacuo while bubbling through carbonic acid. The residue is recrystallized from a large quantity of water with the addition of a small quantity of sulfuric acid. The recrystallized substance melts at about 170–171° C.

I claim as my invention:

1. The process comprising hydrogenating trimethylquinone in an organic solvent which is inert in the hydrogenation process, in the presence of a hydrogenation catalyst.

2. The process comprising hydrogenating trimethylquinone in an organic solvent which is inert in the hydrogenation process with hydrogen, in the presence of a hydrogenation catalyst at ordinary temperature and atmospheric pressure.

3. The process comprising hydrogenating trimethylquinone in alcohol, in the presence of catalytically active palladium.

4. The process comprising hydrogenating trimethylquinone in glacial acetic acid with hydrogen, in the presence of catalytically active palladium.

5. The process comprising hydrogenating trimethylquinone in an organic solvent, in the presence of nickel in the form of a hydrogenation catalyst.

6. The process comprising hydrogenating trimethylquinone in an organic solvent which is inert in the hydrogenation process, in the presence of a hydrogenation catalyst, filtering the catalyst from the solution, and recovering trimethylhydroquinone.

FRITZ JUNG.